United States Patent [19]

Orts

[15] 3,683,147
[45] Aug. 8, 1972

[54] METHOD OF FORGE TYPE WELDING
[72] Inventor: Donald H. Orts, Middletown, Ohio
[73] Assignee: Armco Steel Corporation, Middletown, Ohio
[22] Filed: April 19, 1971
[21] Appl. No.: 135,368

[52] U.S. Cl. .............................219/117 R, 219/92
[51] Int. Cl. .............................................B23k 9/00
[58] Field of Search.....................219/92–94, 118, 219/117

[56] References Cited

UNITED STATES PATENTS

| | | |
|---|---|---|
| 3,135,854 | 6/1964 | Deininger, Jr...............219/92 |
| 2,151,758 | 3/1939 | Gier............................219/92 |

FOREIGN PATENTS OR APPLICATIONS

| | | |
|---|---|---|
| 722,502 | 1/1955 | Great Britain...............219/92 |

Primary Examiner—J. V. Truhe
Assistant Examiner—Gale R. Peterson
Attorney—Melville, Strasser, Foster and Hoffman

[57] ABSTRACT

An improved method of forge type welding ferrous materials which includes interposing a layer of refractory material having a melting point greater than about 1,650° C. and an electrical resistivity less than about 10,000 microohm-cm., at the faying plane of a joint, i.e., between the surfaces of ferrous material to be welded, and simultaneously applying pressure and an electric current normal thereto to effect the welding.

4 Claims, No Drawings

METHOD OF FORGE TYPE WELDING

BACKGROUND OF THE INVENTION

This invention relates to a method for welding ferrous materials, and more particularly to a method for resistance forge welding of ferrous materials wherein a refractory agent is interposed between the materials to be welded.

As is known in the art, resistance welding is a process for joining two or more parts by coalescing portions of the parts as a result of the simultaneous application of pressure and an electrical current. This general procedure may be further divided into two different categories, namely, spot welding and forge welding. In the former, the parts to be joined are first placed between a pair of electrodes and the welding machine runs through a timed cycle commonly comprising squeeze, weld, hold and off. During the squeeze period, the electrodes clamp the parts together and develop a high pressure at the interface of the parts. Then, current is passed through the parts during the weld period to form a confined pool or nugget of molten metal. Thereafter, the current is turned off and the parts remain clamped together during the hold period until the nugget solidifies and cools sufficiently to allow removal of the clamping force without cracking or weakening of the weld. Then the electrodes are withdrawn to allow removal of the joined parts.

The second category which has been defined as forge welding is similar to the above except that no nugget or molten metal is formed at the interface. This procedure, however, requires considerably more pressure to compensate for the lack of molten metal relied upon for the bonding action.

It will be readily appreciated that each of these procedures have their short comings or limitations in joining together two metal parts. For example, it is necessary in the former procedure to fully contain the nugget within solid metal as the molten metal may flow or actually blow out from the joint. This rather obviously presents dangers to the surrounding personnel and equipment. To overcome this, it has been a practice to lessen the current or time for welding such that poor weld joints or no weld joints results. Finally, there are situations in which it is not possible to contain the nugget.

In those situations it was necessary to rely upon the second procedure wherein the bonding is by solid state diffusion assisted by material upset. Unfortunately, this required larger loads or pressure in order to upset the materials to be welded. By way of example, in preparing a T joint of a rolled tube whose end is joined to a flat sheet or plate, it was not possible to spot weld due to the inability to contain the molten nugget. However, to use excessive pressures would have caused a flaring of the tube adjacent the flat sheet or plate. Thus, each of these known procedures were not effective in accomplishing the welding of said T joint.

The present invention has made it possible to effect such type of welds by utilizing or incorporating a layer of refractory type material at the faying plane of the joint. This permitted the lessening of the pressure required to effect the joining of the parts while assuring a satisfactory weld. More particularly, it was discovered that by utilizing a refractory material having a melting point in excess of 1,650° C. and a resistivity between about 500 to about 10,000 microohm-cm., it was possible to effectively weld ferrous materials without resorting to unusually large pressures which could cause the materials to be distorted or upset. It was further discovered that in utilizing a refractory material selected from the group of carbon and graphite that a cleansing action of the joint was achieved. That is, the refractory tended to cleanse the joint of surface oxides.

SUMMARY OF THE INVENTION

This invention relates to an improved method of resistance welding, more particularly to a method for resistance forge welding wherein a layer of refractory type material is interposed between ferrous materials to be welded.

In brief, it was discovered that in forge type welding of ferrous materials it was possible to virtually assure an effective weld by incorporating a layer of refractory material at the faying plane of the joint. That is, by selecting a refractory material having a melting point greater than about 1,650° C. and an electrical resistivity between about 500 to about 10,000 microohm-cm., such effective welding was assured. More specifically, with a refractory material selected from the group of carbon and graphite, whose resistivity falls within the range of about 800 to about 1,500 microohm-cm., up to 100 percent effective welds were achieved.

DESCRIPTION OF THE PREFERRED EMBODIMENT

In the practice of this invention, a procedure is taught whereby consistently effective welds are produced according to a process known as resistance forge welding. Such a procedure is accomplished by the inclusion of a layer of refractory type material at the faying plane of the joint.

The selection of the proper refractory material is critical to the success of this invention. The refractory material must be able to pass an electric current, yet must possess some resistance thereto. Accordingly, only those refractory materials whose resistivity fall within the range of about 500 to 10,000 microohm-cm. can be used. This in effect precludes the use of highly conductive metals such as iron [resistivity equals 10 microohm-cm.] and copper [resistivity equals 2 microohm-cm.]. At the other extreme, such materials as alumnia [$Al_2O_3$] and chalk [$CaCO_3$] are non-conductive and therefore unsuitable. A further and final characteristic of the materials suitable for practicing this invention is a melting point in excess of about 1,650° C. However, since resistivity tables and melting point tables are readily available for the many known refractory materials, it is believed unnecessary to extend the lists above to include all the suitable and unsuitable materials for this invention. That is, one skilled in the art could readily determine the preferred materials by appropriate reference to chemical texts.

In any event, during the development of this invention, it was readily determined that carbon and graphite, whose resistivity lies within the range of about 800 to about 1,500 microohm-cm., would produce highly effective results. Therefore, while the further description will be directed primarily to the application of said last named materials, it should not be read as a limitation on this invention. The limitations herein being the refractory nature of the material, its resistivity, and melting point as set forth above.

It will be recalled from the description above, that the welding procedure of this invention includes the simultaneous application of pressure and an electric current. While pressures are generally measured in the total load, this can be misleading due to the cross sectional area to be welded. Therefore, for the purposes of this invention, but not a limitation thereof, pressures on the order of 70 MN/m$^2$ are contemplated. And, since the pressures are relatively high, particularly with respect to the brittle nature of powder materials, the particle size of the refractory to be used is not critical. In other words, it is expected that if larger particles are employed they would be crushed under the pressures of the welding operation. It was also found during the development of this invention that the thickness of the layer of refractory materials can be quite thin. Specifically, it is only necessary that a single particle layer thickness for the refractory be used. Obviously, a thick layer is not necessary and in fact may be detrimental to the operation.

While it may not be apparent from the initial description above concerning the prior art, it is well known that said prior art procedures rely upon the natural resistance between the two parts to be welded. This is obtained by virtue of the imperfect contact and the surface contamination present for the heat build-up to effect the welding operation. The present development, at least to the extent of the current theory, represents a sharp contrast to this.

While the present invention has produced consistently sound welds, the mechanism by which this is accomplished is not known. However, at least in theory, but without intending to be bound thereby, the following discussion is offered.

The process of this invention is believed to give better heat distribution in the welding operation at the joint to be welded. That is, the graphite or carbon particles at the faying plane of a joint limit the cross-sectional area of the electrical current path and interpose a higher resistance material thereby generating greater heat at the most desirable location. The carbon is relatively refractory and imposes the current path restriction for a considerable portion of the weld cycle. An ancillary advantage of this invention when utilizing same on low carbon ferrous materials such as low carbon steel, is the belief that some of the carbon is taken into solution at the faying plane to add strength to the bond line. Finally, while effecting the sound bond, the carbon or graphite contributes to the cleansing of the joints by combining with and/or reducing the surface oxides typically found on exposed ferrous surfaces.

It should be understood that the operations contemplated herein are equally suitable in related resistance forge welding operations such as mash lap welding, projection welding, or resistance tube welding. These are all well known techniques which can be improved by following the teachings of this invention.

To demonstrate the effectiveness of the present invention over that of the prior art, the following exemplary operation is given.

EXAMPLE

A 1.59cm. O.D. tube of mild steel (AISI—1008), having a wall thickness of about 0.157 cm., was selected to be welded to the face of a sheet of mild steel (AISI—1008), the thickness of which was about 0.147cm. The tube was clamped in a split copper current conducting die within about 1.27cm. of the proposed joint end to prevent the excessive buildup of heat in the tube. Before bringing the tube into contact with the sheet, graphite was wiped on the joint face of the sheet.

While the assembly was in a clamped condition, electrical current on the order of about 13,000 amps. was passed therethrough for about 13 cycles of 60 $H_z$ current, under a load of about 3,500 N. Upon release of the current and load, a sound weld resulted.

While the invention has been described with respect to its most preferred embodiment, it should not be read as a restriction hereon, as modifications are contemplated. This is particularly true of those skilled in the art who read these specifications. Accordingly, no limitation is intended to be imposed herein except as set forth in the appended claims.

The embodiments of the invention in which an exclusive property or privilege is claimed are defined as follows:

1. A method of joining together uncoated ferrous materials in a forge type welding operation where it is not possible to consistently contain a uniform molten weld nugget, comprising the steps of interposing a layer of refractory material at the faying surface of the joint, said refractory material characterized by a melting point greater than about 1,650° C. and a resistivity between about 500 and 10,000 microohm-cm., bringing said ferrous materials together and simultaneously applying pressure and an electric current thereto of such magnitude as to effect said welding without forming a molten weld nugget at the said faying surface.

2. The method claimed in claim 1, wherein said refractory material is applied to at least one of said ferrous materials in powdered form.

3. The method claimed in claim 1, wherein said refractory material is carbon having a resistivity between about 800 and 1,500 microohm-cm.

4. The method claimed in claim 1, wherein said refractory material is graphite having a resistivity between about 800 and 1,500 microohm-cm.

* * * * *